(12) United States Patent
Wei et al.

(10) Patent No.: US 9,146,683 B2
(45) Date of Patent: Sep. 29, 2015

(54) LOGICAL BLOCK ADDRESS MAPPING

(75) Inventors: Bo Wei, Singapore (SG); Steven TianChye Cheok, Singapore (SG); YongPeng Chng, Singapore (SG); CheeSeng Toh, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 363 days.

(21) Appl. No.: 13/090,695

(22) Filed: Apr. 20, 2011

(65) Prior Publication Data
US 2012/0272038 A1 Oct. 25, 2012

(51) Int. Cl.
G06F 12/00 (2006.01)
G06F 3/06 (2006.01)
G06F 12/02 (2006.01)

(52) U.S. Cl.
CPC ............. *G06F 3/0613* (2013.01); *G06F 3/064* (2013.01); *G06F 3/0619* (2013.01); *G06F 3/0647* (2013.01); *G06F 3/0676* (2013.01); *G06F 12/0292* (2013.01)

(58) Field of Classification Search
None
See application file for complete search history.

(56) References Cited

U.S. PATENT DOCUMENTS

| | | | |
|---|---|---|---|
| 5,463,504 A * | 10/1995 | Kimura et al. .................. 360/65 |
| 5,870,363 A * | 2/1999 | Sun et al. .................... 369/47.45 |
| 5,914,928 A | 6/1999 | Takahashi |
| 5,966,726 A | 10/1999 | Sokolov |
| 6,674,598 B2 | 1/2004 | Smith |
| 6,763,430 B1 | 7/2004 | Camp |
| 7,610,320 B2 | 10/2009 | Passerini et al. |
| 8,019,925 B1 * | 9/2011 | Vogan et al. ...................... 711/4 |
| 2002/0095546 A1 * | 7/2002 | Dimitri et al. ................ 711/112 |
| 2003/0225970 A1 * | 12/2003 | Hashemi ....................... 711/114 |
| 2004/0153606 A1 * | 8/2004 | Schott ........................... 711/114 |
| 2005/0229033 A1 | 10/2005 | Tanaka et al. |
| 2006/0227450 A1 * | 10/2006 | Liu et al. .......................... 360/75 |
| 2007/0086106 A1 * | 4/2007 | Hashimoto et al. ............. 360/75 |
| 2008/0148004 A1 * | 6/2008 | Iren et al. ....................... 711/170 |
| 2009/0089504 A1 * | 4/2009 | Soran et al. .................... 711/114 |
| 2010/0271727 A1 * | 10/2010 | Namkoong et al. ............ 360/48 |
| 2010/0306493 A1 * | 12/2010 | Carrillo et al. ................ 711/167 |
| 2011/0138148 A1 * | 6/2011 | Friedman et al. ............. 711/173 |
| 2011/0213945 A1 * | 9/2011 | Post et al. ..................... 711/173 |
| 2011/0283044 A1 * | 11/2011 | Olds et al. ..................... 711/102 |
| 2012/0166725 A1 * | 6/2012 | Soran et al. ................... 711/114 |

* cited by examiner

*Primary Examiner* — Kaushikkumar Patel
(74) *Attorney, Agent, or Firm* — HolzerIPLaw, PC

(57) ABSTRACT

A mapping table is modified to match one or more specified storage conditions of data stored in or expected to be stored in one or more logical block address ranges to physical addresses within a storage drive having performance characteristics that satisfy the specified storage conditions. For example, the performance characteristics may be a reliability of the physical location within the storage drive or a data throughput range of read/write operations. Existing data is moved and/or new data is written to physical addresses on the storage media possessing the performance characteristic(s), according to the mapping table. Further, a standard seeding or a seeding override for the re-mapped logical block addresses can prevent read operations from inadvertently reading incorrect physical addresses corresponding to the re-mapped logical block addresses.

22 Claims, 5 Drawing Sheets

__LOGICAL BLOCK ADDRESS MAPPING__

SUMMARY

Implementations described and claimed herein address the foregoing problems by writing data to physical locations within a storage drive, wherein each of the physical locations possess a performance characteristic that satisfies a specified storage condition for the data.

Other implementations described and claimed herein address the foregoing problems by providing a storage device comprising firmware with access to a mapping table assigning logical block addresses storing data with a specified storage condition to physical addresses on a storage drive, wherein each of the physical addresses possesses a performance characteristic that satisfies the specified storage condition.

Other implementations described and claimed herein address the foregoing problems by creating a mapping table assigning logical block addresses for storing data having a specified storage condition to physical addresses on a storage drive possessing a performance characteristic that satisfies the specified storage condition.

Other implementations are also described and recited herein.

BRIEF DESCRIPTIONS OF THE DRAWINGS

DETAILED DESCRIPTIONS

Figure 1:
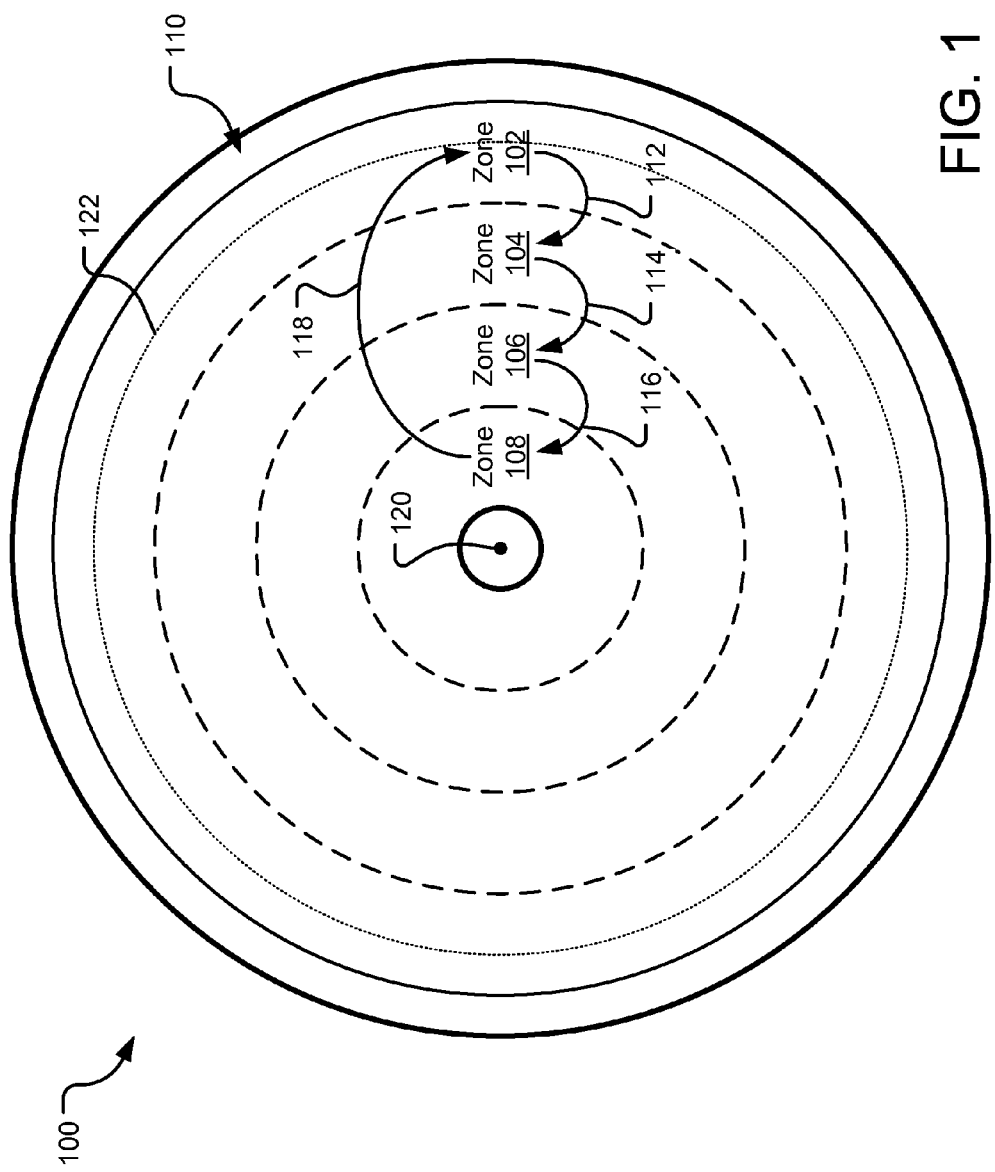
FIG. 1 illustrates an example storage disc with a re-mapped logical block addressing scheme.

FIG. 1 illustrates an example storage disc 100 with a re-mapped logical block addressing scheme. A disc drive may contain one or more storage discs (e.g., storage disc 100). The storage disc 100 may store data on one or both of its planar surfaces (only one planar surface is shown). Further, each planar surface capable of storing data is comprised of a series of thin concentric circular strips known as tracks (e.g., track 122). Each track on a planar surface capable of storing data is assigned a discrete track number identifying the track. A head (not shown) is positioned adjacent to each planar surface capable of storing data. Each head is also assigned a discrete number identifying the head. Each head reads and writes data to and from a corresponding planar surface on a storage disc.

The head is configured to be attached to an air-bearing slider (not shown) at a distal end of an actuator arm flexure (not shown). The slider enables the head to fly in close proximity above a corresponding planar surface of a storage disc. The air-bearing surface of the head is configured to face the storage disc. The actuator arm flexure is attached to a cantilevered actuator arm (not shown) and the actuator arm flexure is adjustable to follow one or more tracks of data on the storage disc. Electrical wires (not shown) extend along the actuator arm flexure and attach to contact pads (not shown) on the slider that ultimately connect to the head. Read/write and other electrical signals pass to and from processing electronics (not shown) to the head via the electrical wires and contact pads.

Logical block addressing (LBA) is a common mapping scheme for specifying the location of specific blocks of data stored within a disc drive (e.g., a hard disc drive, a magnetic disc drive, or an optical disc drive). LBA is a linear addressing scheme where the blocks of data are located by an integer index, with the first block assigned to LBA 0, the second block assigned to LBA 1, and so on.

LBA 0 typically starts with the first sector on the first track accessible by the first head in the disc drive. In a Cylinder-head-sector (CHS) mapping scheme (discussed in detail with regard to FIG. 2), the first track is the outside track on a storage disc within the disc drive (i.e., CHS 0, 0, 1). As a result, the LBA scheme assigns integers to data storage locations on each storage disc starting at the outside track, moving through available sectors on that track and then moving through the sectors on inside tracks until the last available sector in the innermost track of the storage disc has an LBA address.

Each recordable surface on each storage disc within the disc drive may be divided into multiple zones 102, 104, 106, and 108 of recordable tracks corresponding to sequentially increasing LBA ranges. For example, zone 102 may correspond to LBA 00000-09999, zone 104 may correspond to LBA 10000-19999, zone 104 may correspond to LBA 20000-29999, and zone 108 may correspond to LBA 30000-39999. Greater or fewer zones and/or logical block addresses may exist. Further, the quantity of logical block addresses corresponding to a zone may vary as well.

Disc drives, especially those used as system drives, often contain a computer's operating system. Further, the computer's operating system is often one of the first items to be stored on a system drive. Since data is often written to the disc drive sequentially, starting at LBA 00000, the computer's operating system is often stored in outside tracks in the disc drive (e.g., in zone 102). Further, the computer's operating system is accessed frequently and critically important to the operation of the computer. Still further, critical information other than the computer's operating system may also be one of the first items to be stored on the disc drive and thus also stored in outside tracks within the disc drive (e.g., in zone 102).

Typically, disc drives include a guard band area (e.g., guard band 110) outside of the outermost zone (e.g., zone 102). The guard band 110 is used as a landing area for a corresponding drive head (not shown) away from the zones 102, 104, 106, 108 when the disc drive is at rest or not in operation. This reduces damage to the zones caused by the drive head inadvertently contacting the storage disc 100 (e.g., when the disc drive experiences a shock event, like being dropped or physically impacted). However, since zone 102 is adjacent to the guard band 110, it has a relatively higher risk of inadvertent contact with the drive head as compared to zones 104, 106, 108. As a result, zone 102 has a relatively higher risk of damage, and thus lower reliability, as compared to zones 104, 106, 108. Reliability is an example performance characteristic as discussed herein. Since zone 102 has a higher risk of damage and resulting data loss, zone 102 is not ideal for storage of a computer's operating system or other critical and/or frequently accessed data.

FIG. 1 illustrates re-mapping the first LBA range (e.g., LBA 00000-09999) away from zone 102 to reduce the possibility of data loss to the frequently accessed and/or critically important data. For example, LBA ranges 00000-09999, which likely contain the critical and/or frequently accessed data, are shifted from zone 102 to zone 104 as illustrated by arrow 112. LBA ranges 10000-19999 are shifted from zone 104 to zone 106 as illustrated by arrow 114. LBA ranges 20000-29999 are shifted from zone 106 to zone 108 as illustrated by arrow 116. LBA ranges 30000-39999 are shifted from zone 108 to zone 102 as illustrated by arrow 118. In other implementations, the first LBA range (e.g., LBA 00000-09999) is re-mapped to any zone away from the guard band area and the other zones are shifted, shuffled, or otherwise reorganized accordingly in any arrangement. In some implementation, only a portion of an LBA range containing a computer's operating system or other critical and/or frequently accessed data is re-mapped (e.g., only LBA ranges 00135-05763 are re-mapped to a zone other than zone 102).

Further, outer zones of the storage disc 100 typically have a higher throughput than inner zones. This is due to increasing tangential speed of the storage disc 100 with distance from a point of rotation 120. Outer zones of the storage disc 100 move more quickly beneath a corresponding drive head than inner zones, improving throughput. Some data to be stored on the storage disc 100 may have specific throughput requirements (e.g., a minimum throughput, a maximum throughput, or a throughput range). Throughput is an example performance characteristic as discussed herein. Logical block addresses may be shifted to reorganize the data to be stored on the storage disc 100 to be placed based on the specific throughput requirements.

In one implementation, the throughput of the storage disc 100 declines generally linearly from the outermost zones to the innermost zones. When the logical block addresses are shifted, there may be a sharp increase or decrease in throughput between adjacent LBA ranges because the adjacent LBA ranges are not physically adjacent on the storage disc 100. For example, when LBA ranges 30000-39999 are shifted from zone 108 to zone 102 as illustrated by arrow 118 in FIG. 1, there is an abrupt increase in throughput between LBA range 20000-29999 in zone 108 and LBA range 30000-39999 in zone 102. To compensate for this increase in throughput, artificial read/write delays may be inserted into LBA range 30000-39999 to decrease its throughput to a level equal or nearly equal to LBA range 20000-29999.

In one implementation, other processes may be used to fill the artificial read/write delays. For example, additional read-back and verify processes may fill the artificial read/write delays and offer additional assurance that a head is properly aligned with the storage disc 100. A more complicated re-mapping scheme may utilize numerous read/write delays of different quantities in numerous LBA ranges to produce an overall throughput range across the storage disc 100 with a traditional linear slope. In other implementations, the read/write delays may be used to create a relatively constant throughput range across the storage disc 100.

Storage drives without one or more storage discs functioning as storage media (i.e., non-disc storage drives, such as solid-state drives), may not include guard bands and/or drive heads. As a result, there are no zones adjacent to a guard band that have a relatively higher risk of inadvertent contact with a drive head. Further, the non-disc storage drives may not have outer zones with a different throughput than inner zones. However, the non-disc storage drives may still have zones that are less reliable than other zones and/or zones with a relatively higher throughput than other zones. As a result, the presently disclosed LBA re-mapping may be used to move a computer's operating system or other critical and/or frequently accessed data away from less reliable zones within a non-disc storage drive and/or reorganize the data to be stored on the non-disc storage drives based on specific throughput requirements.

Figure 2:
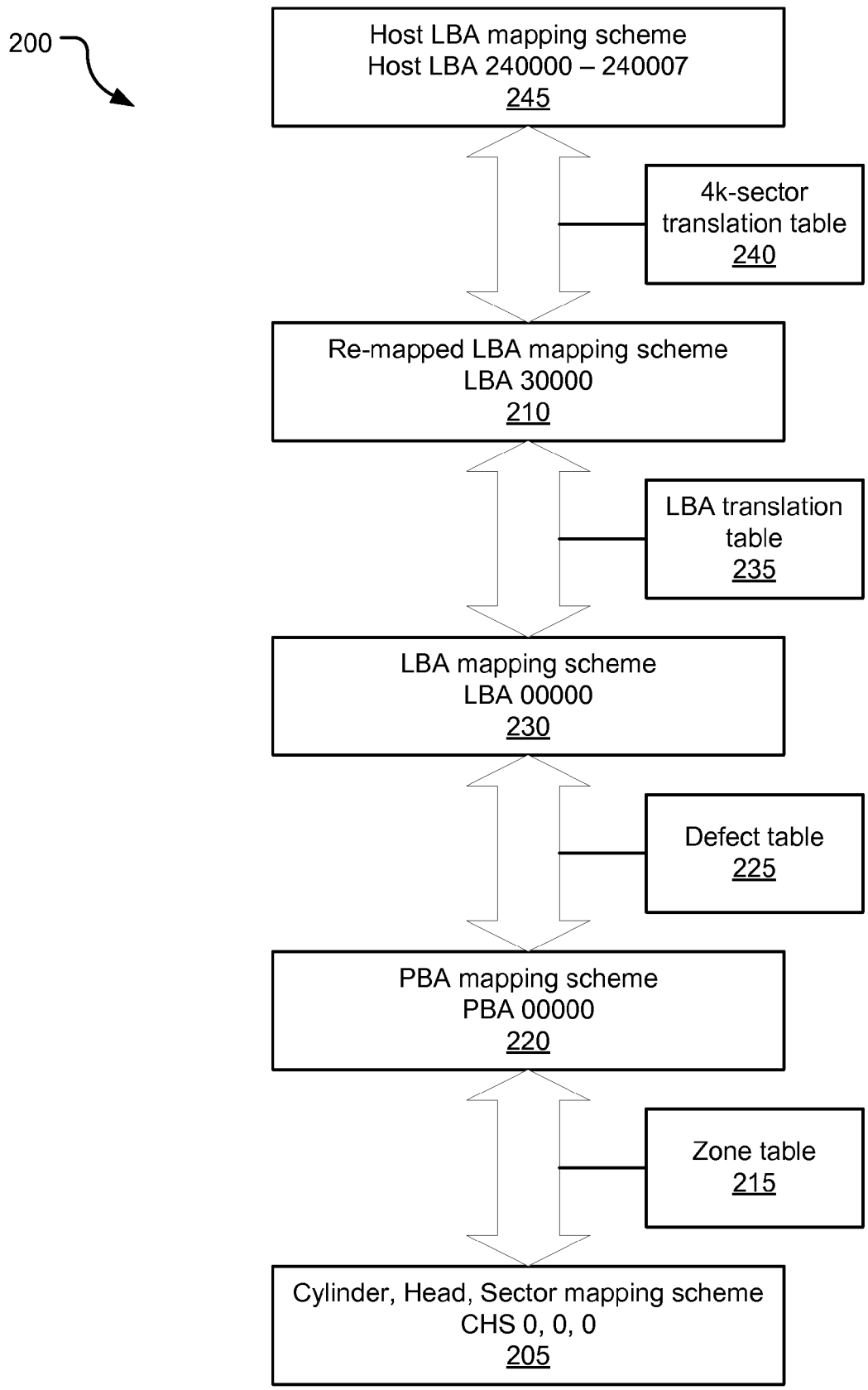
FIG. 2 illustrates an example control flow diagram for converting a cylinder-head-sector mapping scheme to a re-mapped logical block address mapping scheme.

FIG. 2 illustrates an example control flow diagram 200 for converting a cylinder-head-sector mapping scheme 205 to a re-mapped logical block address mapping scheme 210. In a disc drive implementation, specific blocks of data stored within the disc drive are physically located by the Cylinder-head-sector (CHS) mapping scheme 205, which includes three integers (e.g., CHS 0, 0, 0). Each integer in the CHS mapping scheme 205 corresponds to a specific cylinder, head, and sector within the disc drive.

CHS mapping assigns an address to each physical block of data (or sector) on one or more storage discs within a disc drive. CHS mapping utilizes discrete values corresponding to cylinder, head, and sector within the disc drive to specify a block of data (or sector) within the disc drive. The cylinder value refers to the same track number of each planar surface capable of storing data on each storage disc within the disc drive. The head value refers to a specific head within the disc drive. Sometimes a planar surface on a specific storage disc may be substituted for the specific head, especially in applications where the storage discs may be separated from the heads in a disc drive (e.g., a removable disc media in a storage drive). The sector value refers to a subdivision of a track (e.g., a pie-shaped section of a storage disc). In some implementations, the sector is the smallest storage unit in the disc drive.

A zone table 215 maps each unique combination of cylinder, head, and sector in the CHS mapping scheme to a physical block address (PBA) in a PBA mapping scheme 220, which includes one sequentially increasing integer. For example, CHS 0, 0, 0 may map to PBA 00000 (as illustrated); CHS 0, 0, 1 may map to PBA 00001; CHS 0, 1, 0 may map to PBA 00064; and so on. As a result, there is a unique physical block address integer for each unique combination of cylinder, head, and sector in the disc drive defined by the zone table 215. The zone table 215 may also define ranges of physical block addresses that are assigned to zones on one or more storage discs in the storage drive (see e.g., FIG. 1).

There are often a number of physical block addresses that are unavailable for reading data from and/or writing data to the disc drive. This may be due to errors detected on the storage disc, for example. Defect table 225 tracks the unavailable physical block addresses and maps the available physical block addresses in the PBA mapping scheme 220 to logical block addresses (LBA) in an LBA mapping scheme 230, which also includes one sequentially increasing integer.

For example, if physical block addresses 00002 and 00004 are unavailable due to errors on the storage disc, LBA mapping scheme 230 will skip PBAs 00002 and 00004. More specifically the defect table 225 may map PBA 00000 to LBA 00000; PBA 00001 to LBA 00001; PBA 00003 to LBA 00002; PBA 00005 to LBA 00003; and so on. As a result, the LBA mapping scheme 230 contains a sequentially increasing series of integers corresponding to all combinations of cylinder, head, and sector within the disc drive that are available for storing data.

A LBA translation table 235 re-maps at least a portion of the LBA addresses to new LBA addresses in the re-mapped LBA mapping scheme 210. The re-mapped LBA mapping scheme 210 is specifically configured to satisfy one or more specified storage conditions (e.g., criticality of the data or a desired access speed for the data). The re-mapped LBA mapping scheme 210 may then direct specific data away from areas of the storage disc that do not have performance characteristics (e.g., relatively unreliable areas of the storage disc or relatively low throughput areas) that satisfy the specified storage conditions for that data.

In an example implementation, data intended to be stored at LBA 00000-00010 of a storage disc is critical for operation of a computing system associated with the storage disc. Further, LBA 00000-00010 of a storage disc is considered unreliable as compared to other areas of the storage disc due to the relative proximity of LBA 00000-00010 to a guard band. As a result, LBA translation table 235 may remap LBA 00000-00010 to LBA 30000-30010. Other LBA ranges may be re-mapped as well. In some implementations, entire bands of logical block addresses are remapped together. In other implementations, only selected portions of one or more bands of logical block addresses are remapped.

The LBA translation table 235 may be used to re-map specific logical block addresses after the defect table 225 and the zone table 215 are used as described above. As a result, neither the defect table 225 nor the zone table 215 must be rebuilt when LBA re-mapping is applied to the storage drive. Further, the storage drive may be re-mapped without re-formatting the storage drive because the defect table 225 and the zone table 215 remain unchanged.

In implementations utilizing sector sizes other than the standard 512-bytes (e.g., 4k-sector storage drives), an additional translation table (e.g., 4k-sector translation table 240) may be used to map the re-shuffled LBA addresses to an additional host LBA mapping scheme 245. The host LBA mapping scheme 245 converts the 4k-sector representation of the re-shuffled LBA addresses to standard 512-byte sector sizes. For example, 4k-sector translation table 240 maps one 4-kilobyte re-shuffled LBA address 30000 to eight 512-byte host LBA addresses 240000-240007. The conversion may be accomplished in storage drives with or without logical sector alignment between the 4k-sector storage drive and the 512-byte host LBA mapping scheme 245. 4-kilobyte and 512-byte sector sizes are used as examples only; other sector sizes are contemplated herein.

In another implementation, a new zone table (not shown) is introduced that re-maps an entire PBA zone (e.g., PBA 00000-09999) away from an area of the storage disc that fails to satisfy one or more performance characteristics (e.g., the area is either unreliable or not within a throughput requirement for that range of data). For example, the new zone table may map an entire zone starting with CHS 0, 0, 0 to physical block addresses starting with PBA 30000. In this implementation, LBA translation table 235 and re-mapped LBA mapping scheme 210 are unnecessary because the new zone table achieves the desired re-mapping.

Any one or more of the zone table 215, defect table 225, LBA translation table 235, and 4k-secto translation table may be referred to herein as a mapping table.

Figure 3:
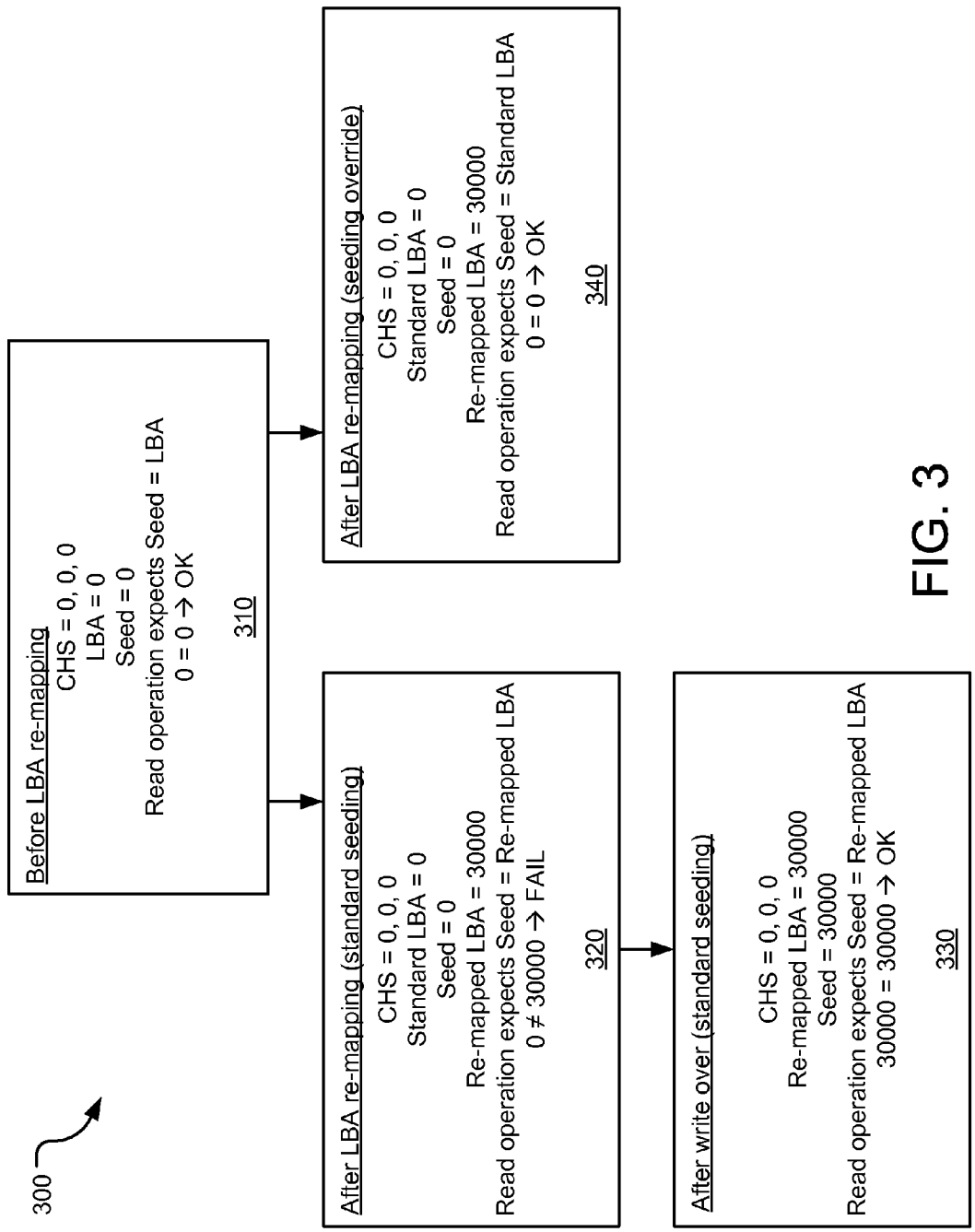
FIG. 3 illustrates an example control flow diagram using standard seeding or a seeding override for re-mapped logical block addresses.

FIG. 3 illustrates an example control flow diagram 300 using standard seeding or a seeding override for a re-mapped logical block addresses. The seeding allows read operations to verify that the read physical sector is the desired sector. Each sector on a storage drive contains seeding information, which stores the corresponding logical block address of the physical sector. Since the sectors are physically so close together, a read operation may inadvertently read the wrong sector. The seeding information notifies the firmware that the read operation has read the wrong sector. The read operation is repeated to read the intended sector and/or the head position/timing is adjusted to read the intended sector.

After performing logical block address re-mapping on a storage drive, existing standard seeding information in the drive is no longer valid. At least two options are available to correct the seeding. First, the drive may be write passed to update the seeding in each sector. Second, a seeding override may be used to point the seeding information to the physical block address or original logical block address as opposed to the re-mapped logical block address corresponding to each sector.

For example, block 310 illustrates the state of a read operation before logical block address re-mapping. A CHS address of 0, 0, 0 corresponds to a LBA of 0 and the seeding is also set to 0. When a read operation on CHS 0, 0, 0 occurs, the read operation expects to read a seed corresponding to the LBA. Since the expected seed and the actual seed both equal zero, the read operation can proceed.

Block 320 illustrates the state of a read operation after logical block address re-mapping, but maintaining the standard seeding scheme. Like block 320, a CHS address of 0, 0, 0 corresponds to a LBA of 0 and the seeding is also set to 0. However, a mapping table has subsequently re-mapped logical block address 30000 to the CHS address of 0, 0, 0. When a read operation on CHS 0, 0, 0 occurs, the read operation expects to read a seed corresponding to the re-mapped LBA. Since the expected seed is 30000 and the actual seed is 0, the read operation fails.

As a result, the drive may be written over after the logical block address re-mapping to update the seeding in each CHS address. Block 330 illustrates the state of a read operation after a write-over, maintaining the standard seeding scheme. After the write-over, the CHS address of 0, 0, 0 corresponds to a LBA of 30000 and the seeding is also set to 30000. When a read operation on CHS 0, 0, 0 occurs, the read operation expects to read a seed corresponding to the re-mapped LBA. Since the expected seed and the actual seed both equal 30000, the read operation can proceed. In some implementations, this technique is undesirable because it is time consuming to re-write the storage drive every time a logical block address re-mapping occurs.

In another implementation, the standard seeding is overridden to point to the standard LBA or PBA, regardless of any LBA re-mapping. For example, block 340 illustrates the state of a read operation after logical block address re-mapping and incorporating the overridden seeding scheme. A CHS address of 0, 0, 0 corresponds to a LBA of 0 and the seeding is also set to 0. A mapping table has subsequently re-mapped logical block address 30000 to the CHS address of 0, 0, 0. When a read operation on CHS 0, 0, 0 occurs, the read operation expects to read a seed corresponding to the standard LBA (0), not the re-mapped LBA (30000). As a result, since the expected seed and the actual seed both equal zero, the read operation can proceed. This technique avoids the often undesirable side-effect of re-writing the storage drive every time a logical block address re-mapping occurs.

Figure 4:
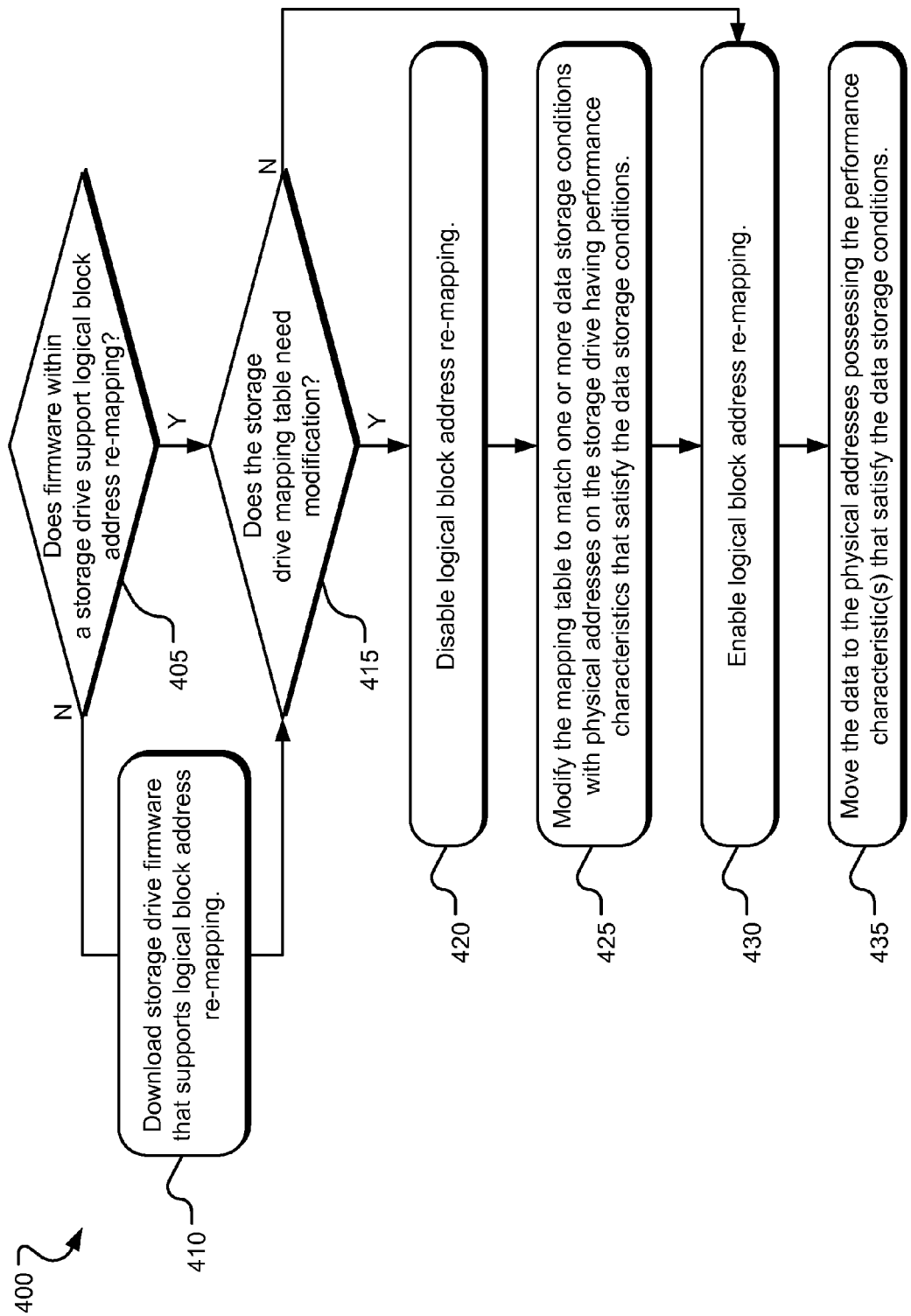
FIG. 4 illustrates example operations for upgrading an existing storage drive with firmware that supports logical block address re-mapping.

FIG. 4 illustrates example operations 400 for upgrading an existing storage drive with firmware that supports logical block address re-mapping. In a decision operation 405, firmware on a storage drive is inspected to determine if the storage drive supports logical block address re-mapping. If the storage drive firmware does not support logical block address re-mapping, downloading operation 410 may download updated firmware for the storage drive that supports logical block address re-mapping. Downloading operation 410 may be performed manually by a user or automatically by existing storage drive firmware or software after it is determined that the firmware on the storage drive does not support logical block address re-mapping.

If the existing storage drive firmware already supports logical block address re-mapping or after updated firmware is downloaded in operation 410, decision operation 415 determines if a storage drive mapping table needs any modifications. The storage drive mapping table may utilize cylinder-head-sector addresses, physical block addresses and/or logical block addresses. Further, the mapping table may be characterized as a zone table, defect table and/or a translation table, for example. For example, one or more desired performance characteristics of data stored in or expected to be stored in one or more logical block address ranges may not be mapped to physical addresses having those performance characteristics. The mapping table may need to be modified to better match the desired performance characteristics to physical addresses having those performance characteristics.

If decision operation 415 determines that the mapping table needs modification, disabling operation 420 disables logical block address re-mapping in the storage drive, if it is currently enabled. Modification operation 425 modifies the mapping table to match one or more storage conditions of data stored in or expected to be stored in one or more logical block address ranges to physical addresses on the storage drive having performance characteristics that satisfy the data storage conditions. For example, a data storage condition may be high reliability and the performance characteristic may be physical address reliability. In another example implementation, the data storage condition is high-speed access and the performance characteristic may be physical address access speed. For yet other example implementations, the performance characteristics is a reliability of the physical location on the storage media (e.g., proximity to a guard band on a storage media disc) or a data throughput range of read/write operations, for example.

Following modification operation 425 or if decision operation 415 determined that the mapping table did not need modification, enabling operation 430 enables logical block address re-mapping on the storage drive, if currently disabled. Moving operation 435 moves existing data to the physical addresses on the storage media possessing the performance characteristic(s) that satisfy the data storage conditions according to the mapping table. Further, if the physical addresses on the storage media possessing the desired performance characteristic(s) are already storing data, that data may be moved elsewhere in the storage drive. Additional new data may also be written to physical addresses on the storage drive possessing desired performance characteristic(s) of the new data, according to the mapping table.

Figure 5:
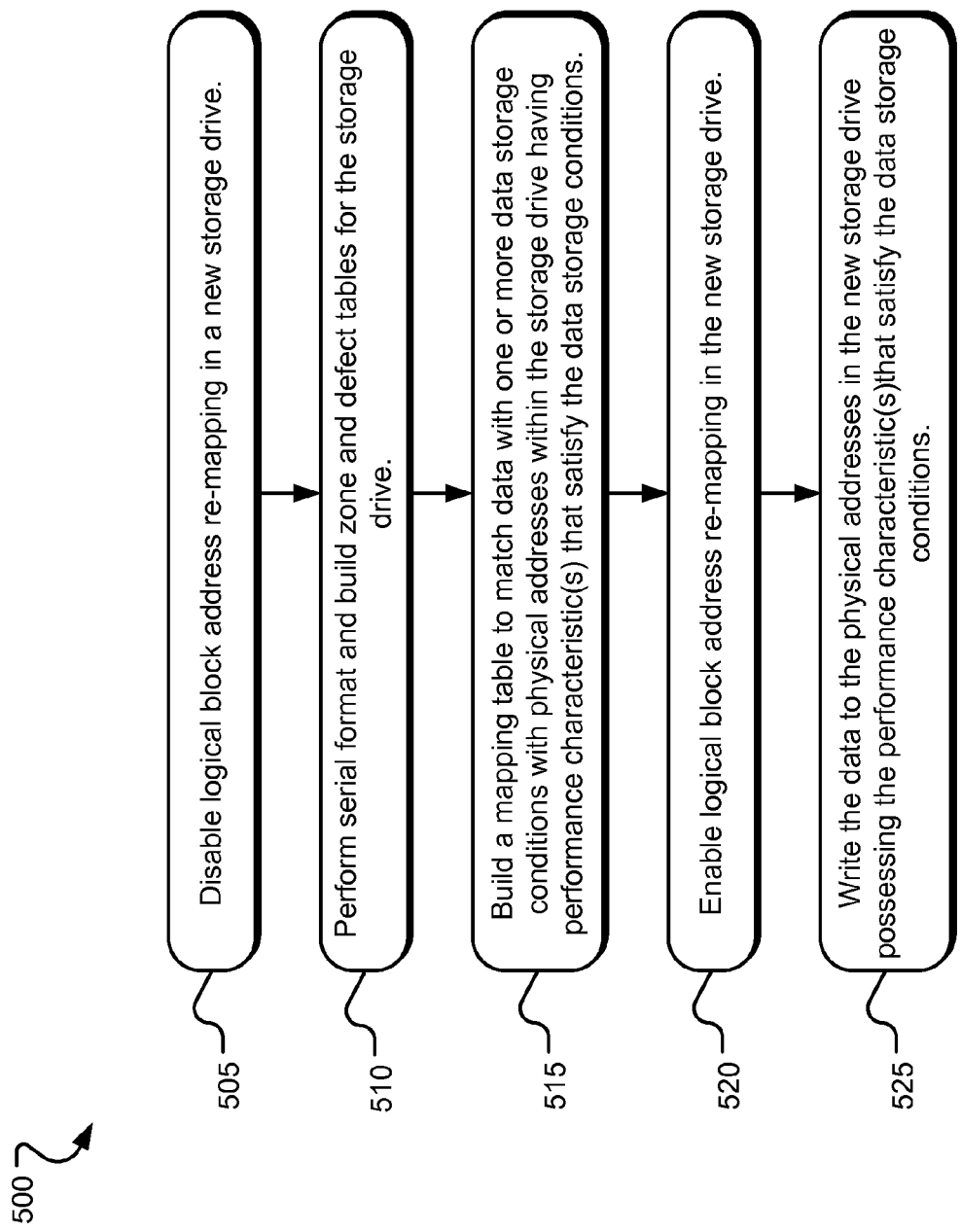
FIG. 5 illustrates example operations for certifying a new storage drive with firmware that supports logical block address re-mapping.

FIG. 5 illustrates example operations 500 for certifying a new storage drive with firmware that supports logical block address re-mapping. Disabling operation 505 disables logical block address re-mapping in the storage drive, if it is currently enabled. Drive formatting operations 510 perform a serial format on the storage drive and build zone and defect tables for the storage drive. The drive formatting operations 510 may be performed by diagnostic or interface command. The drive formatting operations 510 include normal certification processes for a new storage drive.

Building operation 515 builds (or modified an existing) mapping table to match one or more storage conditions of data stored in or expected to be stored in one or more logical block address ranges to physical addresses on the storage drive having performance characteristics that satisfy the data storage conditions. For example, a data storage condition may be high reliability and the performance characteristic may be physical address reliability. In another example implementation, the data storage condition is high-speed access and the performance characteristic may be physical address access speed. The storage drive mapping table may utilize cylinder-head-sector addresses, physical block addresses and/or logical block addresses. Further, the mapping table may be characterized as a zone table, defect table and/or a translation table, for example.

Enabling operation 520 enables logical block address re-mapping on the storage drive. Writing operation 525 writes data to the physical addresses on the storage media possessing the performance characteristic(s) that satisfy the data storage conditions according to the mapping table. Further, if the physical addresses on the storage media possessing the desired performance characteristic(s) are already storing data, that data may be moved elsewhere in the storage drive. The performance characteristics may be a reliability of the physical location on the storage media (e.g., proximity to a guard band on a storage media disc) or a data throughput range of read/write operations, for example.

In one implementation, the logical block re-mapping may be enabled or disabled on the fly as the storage drive is in operation without rebuilding the defect tables or reformatting the storage drive. Further, the mapping table may also be modified on the fly as the storage drive is in operation without rebuilding the defect tables or reformatting the storage drive.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   selecting a discrete physical location on a storage medium for storage of data based on a criticality of the data, the select discrete physical location positioned closer to an outer diameter of the storage medium when the data is of a lower criticality than when the data is of a higher criticality; and
   writing the data to the select discrete physical location.

2. The method of claim 1, further comprising:
   creating a translation table that associates physical addresses nearer to the outer diameter of the storage medium with logical block addresses storing data of the lower criticality, wherein the writing operation is performed using the logical block addresses in the zone table.

3. The method of claim 1, further comprising:
   creating a translation table containing relationships between logical block addresses as originally mapped to physical addresses on the storage medium and re-mapped logical block addresses corresponding to the physical addresses on the storage medium, wherein the writing operation is performed using the re-mapped logical block addresses in the translation table.

4. The method of claim 3, wherein the data is written with seeding values updated based on at least one of the re-mapped logical block addresses.

5. The method of claim 3, further comprising:
assigning a seeding value to the data based on an associated one of the originally-mapped logical block addresses.

6. The method of claim 3, further comprising:
inserting a read/write delay for access to the re-mapped logical block addresses to match an expected throughput based on adjacent logical block addresses.

7. The method of claim 1, wherein the writing operation includes moving a range of logical block addresses to a different physical zone on the storage medium.

8. The method of claim 1, wherein the criticality of the data is indicated by a logical block address of the data.

9. The method of claim 1, wherein the data is of the higher criticality when the data is operating system data.

10. The method of claim 1, further comprising:
moving previously written data to physical locations on the storage medium providing data reliability based on criticality of the data.

11. The method of claim 1, wherein the storage medium is a magnetic storage disc, an optical storage disc, or a solid state drive.

12. The method of claim 1, wherein the physical locations are organized using a cylinder-head-sector physical addressing scheme.

13. A storage device comprising:
firmware with access to a mapping table assigning logical block addresses associated with a low data criticality to discrete physical locations within an outermost diameter region of a storage component while assigning logical block addresses associated with a comparatively high data criticality to discrete physical locations radially inward of the outermost diameter region of the storage component.

14. The storage device of claim 13, wherein the mapping table is a zone table containing relationships between the physical addresses on the storage component and the logical block addresses.

15. The storage device of claim 13, wherein the mapping table is a translation table containing relationships between logical block addresses as originally mapped to physical addresses on the storage component and re-mapped logical block addresses corresponding to the physical addresses on the storage component.

16. The storage device of claim 13, wherein the firmware inserts a read/write delay for access to the re-mapped logical block addresses to match an expected throughput based on adjacent logical block addresses.

17. The storage device of claim 13, wherein the storage component includes one or more storage media, wherein the data is written to the storage media with seeding values updated based on the re-mapped logical block addresses.

18. The storage device of claim 13, wherein the firmware assigns seeding values to the data based on the logical block addresses as originally mapped to physical addresses on the storage component.

19. A method comprising:
creating a mapping table assigning logical block addresses associated with a low data criticality to discrete physical locations within an outermost diameter region on a storage component while assigning logical block addresses associated with a comparatively high data criticality to discrete physical locations radially inward of the outermost diameter region of the storage component.

20. The method of claim 19, wherein the mapping table is a translation table containing relationships between logical block addresses as originally mapped to physical addresses on the storage component and re-mapped logical block addresses corresponding to the physical addresses on the storage component.

21. The storage device of claim 13, wherein the storage component is a magnetic storage disc, an optical storage disc, or a solid state drive.

22. The method of claim 19, wherein the storage component is a magnetic storage disc, an optical storage disc, or a solid state drive.

* * * * *